United States Patent
Rakshit

(10) Patent No.: US 10,747,804 B2
(45) Date of Patent: Aug. 18, 2020

(54) FOCUS-ASSISTED INTELLIGENT PERSONAL ASSISTANT QUERY RESPONSE DETERMINATION

(71) Applicant: INTERNATIONAL BUSINESS MACHINES CORPORATION, Armonk, NY (US)

(72) Inventor: Sarbajit K. Rakshit, Kolkata (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 502 days.

(21) Appl. No.: 15/284,937

(22) Filed: Oct. 4, 2016

(65) Prior Publication Data

US 2018/0095530 A1  Apr. 5, 2018

(51) Int. Cl.
| | | |
|---|---|---|
| G06F 3/00 | (2006.01) | |
| G06F 9/00 | (2006.01) | |
| G06F 17/00 | (2019.01) | |
| G06F 16/44 | (2019.01) | |
| G06F 16/29 | (2019.01) | |
| G06F 3/16 | (2006.01) | |

(52) U.S. Cl.
CPC ............ G06F 16/444 (2019.01); G06F 16/29 (2019.01); G06F 3/167 (2013.01)

(58) Field of Classification Search
CPC ......... G06F 17/30061; G06F 17/30041; G06F 17/30017; G06F 17/30861; G06F 16/444; G06F 16/29; G06F 3/167
See application file for complete search history.

(56) References Cited

U.S. PATENT DOCUMENTS

| | | | | |
|---|---|---|---|---|
| 9,286,029 | B2 * | 3/2016 | Raux ..................... | G06F 3/167 |
| 2009/0070293 | A1 * | 3/2009 | Vechersky ............. | G06F 16/29 |
| 2012/0253802 | A1 | 10/2012 | Heck et al. | |
| 2012/0256745 | A1 * | 10/2012 | Piett ..................... | G06Q 30/02 |
| | | | | 340/540 |
| 2012/0309422 | A1 * | 12/2012 | Lewis-Evans ...... | B60R 25/1025 |
| | | | | 455/456.1 |

(Continued)

OTHER PUBLICATIONS

"Hey Siri What's the Best Sushi Place in Town?", www.apple.com/ios/siri, date accessed Apr. 27, 2016, 5 pgs.

(Continued)

*Primary Examiner* — Kieu D Vu
*Assistant Examiner* — Anita D. Chaudhuri
(74) *Attorney, Agent, or Firm* — Michael O'Keefe; Matthew M. Hulihan; Heslin Rothenberg Farley & Mesiti PC

(57) ABSTRACT

Focus-assisted intelligent personal assistant query response determination is provided. A query submitted by an individual to an intelligent personal assistant is obtained and a direction of focus of the individual at a time the individual submits the query to the intelligent personal assistant is identified. Image(s) of an environment in the direction of focus of the individual are obtained and, based at least in part on the direction of focus, a geographic area to which the query applies is determined. A response to the query is determined at least in part by searching user-generated content associated with the geographic area. The response is validated against the captured image(s) of the environment, and the query is responded to by providing the determined response.

17 Claims, 9 Drawing Sheets

(56) References Cited

U.S. PATENT DOCUMENTS

| | | | | |
|---|---|---|---|---|
| 2013/0030811 | A1* | 1/2013 | Olleon | B60K 35/00 |
| | | | | 704/267 |
| 2014/0010391 | A1* | 1/2014 | Ek | G06F 3/011 |
| | | | | 381/310 |
| 2014/0081998 | A1* | 3/2014 | Fan | G06F 16/29 |
| | | | | 707/754 |
| 2014/0136013 | A1 | 5/2014 | Wolverton et al. | |
| 2014/0236472 | A1 | 8/2014 | Rosario | |
| 2014/0361973 | A1* | 12/2014 | Raux | G06F 3/167 |
| | | | | 345/156 |
| 2016/0148108 | A1* | 5/2016 | Jericho | G06N 5/04 |
| | | | | 706/11 |

OTHER PUBLICATIONS

Sterling, Greg, "Head to Head: Siri vs. Google Voice Actions", http://searchengineland.com/head-to-head-siri-vs-google-voice-actions-96998, Oct. 16, 2011, 11 pgs.

Moore, Quentin "How to Use Siri, Siri Commands List for iPhone 6 & iPad", https://techranker.net/how-to-use-siri-siri-commands-list-questions-to-ask-siri-app/, Apr. 9, 2016, 16 pgs.

Sullivan, Danny, "How Google Now, Siri & Cortana Predict What You Want", http://searchengineland.com/how-google-now-siri-cortana-predict-what-you-want-229799, Sep. 18, 2015, 15 pgs.

Price, David, http://www.macworld.co.uk/feature/iosapps/complete-guide-siri-ios-features-commands-questions-voices-ios-9-apple-music-proactive-3495151/, Oct. 22, 2015, 16 pgs.

* cited by examiner

FOCUS-ASSISTED INTELLIGENT PERSONAL ASSISTANT QUERY RESPONSE DETERMINATION

BACKGROUND

Global Positioning System (GPS) technology is available to guide individuals along a travel route while providing additional information such as points of interest. Both the guidance data and the additional information is typically stored on a remote server. This and other location based services utilize an indication of the individual's location as detected by a location device, such as one built into the individual's mobile device, and software delivers appropriate information and services to the individual. Additionally, voice-based intelligent personal assistants provide different voice-based question and answer services in which software of the individual's mobile device (as an example) receives an input voice-based query and forwards the input query or a variant thereof to a remote server to search for a response to the query. Example voice-based intelligent personal assistants include and/or are incorporated into the Siri® voice recognition software (offered by Apple Inc., Cupertino, Calif., U.S.A., of which SIRI is a registered trademark), the Google Now service (offered by Google Inc., Mountain View, Calif., U.S.A., of which GOOGLE NOW is a trademark), the Cortana® personal assistant (offered by Microsoft Corporation, Redmond, Wash., U.S.A., of which CORTANA is a registered trademark), and the Alexa Internet Service (offered by Amazon.com, Inc., Seattle, Wash., U.S.A.).

While searching of a request may be accomplished through an internet search when the request self-contains the necessary information (such as 'how many fluid ounces are in a quart?'), current intelligent personal assistants are largely unable to handle queries that rely on additional contextual information to inform a well-defined query.

SUMMARY

An individual may wish to present a query that is premised on some information not delivered by the user as part of the query itself. As an example, while in transit an individual may have a question about an event on the side of a road. The individual might view a group of people standing in close proximity. A simple explanation may be that the group is waiting at a public transit stop for a bus to arrive. However, a convenient query to an intelligent personal assistant—"Why is that group of people waiting over there?"—may present an incomplete and informal question that the intelligent personal assistant is unable to answer without additional contextual information about the query. An internet search of "Why is that group of people waiting over there?" will likely provide no adequate result. Additional information to assist in discovery of the answer might include indications of the direction in which the individual is looking at the time of the request and the particular geographic area that is the subject of the request, e.g. the location of the group of people.

Facilities are needed with which non-standard questions can be answered by an intelligent personal assistant, such as a voice-based intelligent personal assistant. Shortcomings of the prior art are overcome and additional advantages are provided through the provision of a computer-implemented method. The method obtains a query submitted by an individual to an intelligent personal assistant. The method also identifies a direction of focus of the individual at a time the individual submits the query to the intelligent personal assistant. The method obtains one or more images of an environment in the direction of focus of the individual. The method determines, based at least in part on the direction of focus, a geographic area to which the query applies. The method also determines a response to the query, this determination of the response including searching user-generated content associated with the geographic area. The method validates the response against the captured one or more images of the environment. Additionally, the method responds to the query with the determined response.

Further, a computer program product including a computer readable storage medium readable by a processor and storing instructions for execution by the processor is provided for performing a method. The method obtains a query submitted by an individual to an intelligent personal assistant. The method also identifies a direction of focus of the individual at a time the individual submits the query to the intelligent personal assistant. The method obtains one or more images of an environment in the direction of focus of the individual. The method determines, based at least in part on the direction of focus, a geographic area to which the query applies. The method also determines a response to the query, this determination of the response including searching user-generated content associated with the geographic area. The method validates the response against the captured one or more images of the environment. Additionally, the method responds to the query with the determined response.

Yet further, a computer system is provided that includes a memory and a processor in communications with the memory, wherein the computer system is configured to perform a method. The method obtains a query submitted by an individual to an intelligent personal assistant. The method also identifies a direction of focus of the individual at a time the individual submits the query to the intelligent personal assistant. The method obtains one or more images of an environment in the direction of focus of the individual. The method determines, based at least in part on the direction of focus, a geographic area to which the query applies. The method also determines a response to the query, this determination of the response including searching user-generated content associated with the geographic area. The method validates the response against the captured one or more images of the environment. Additionally, the method responds to the query with the determined response.

Additional features and advantages are realized through the concepts described herein.

BRIEF DESCRIPTION OF THE DRAWINGS

Aspects described herein are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Described herein are facilities providing focus-assisted intelligent personal assistant (IPA) query response determination. Focus refers to a focal direction of an individual providing the query, the user's focal direction being to a scene, event, object, person, etc. to which a user-provided query applies.

Figure 1:
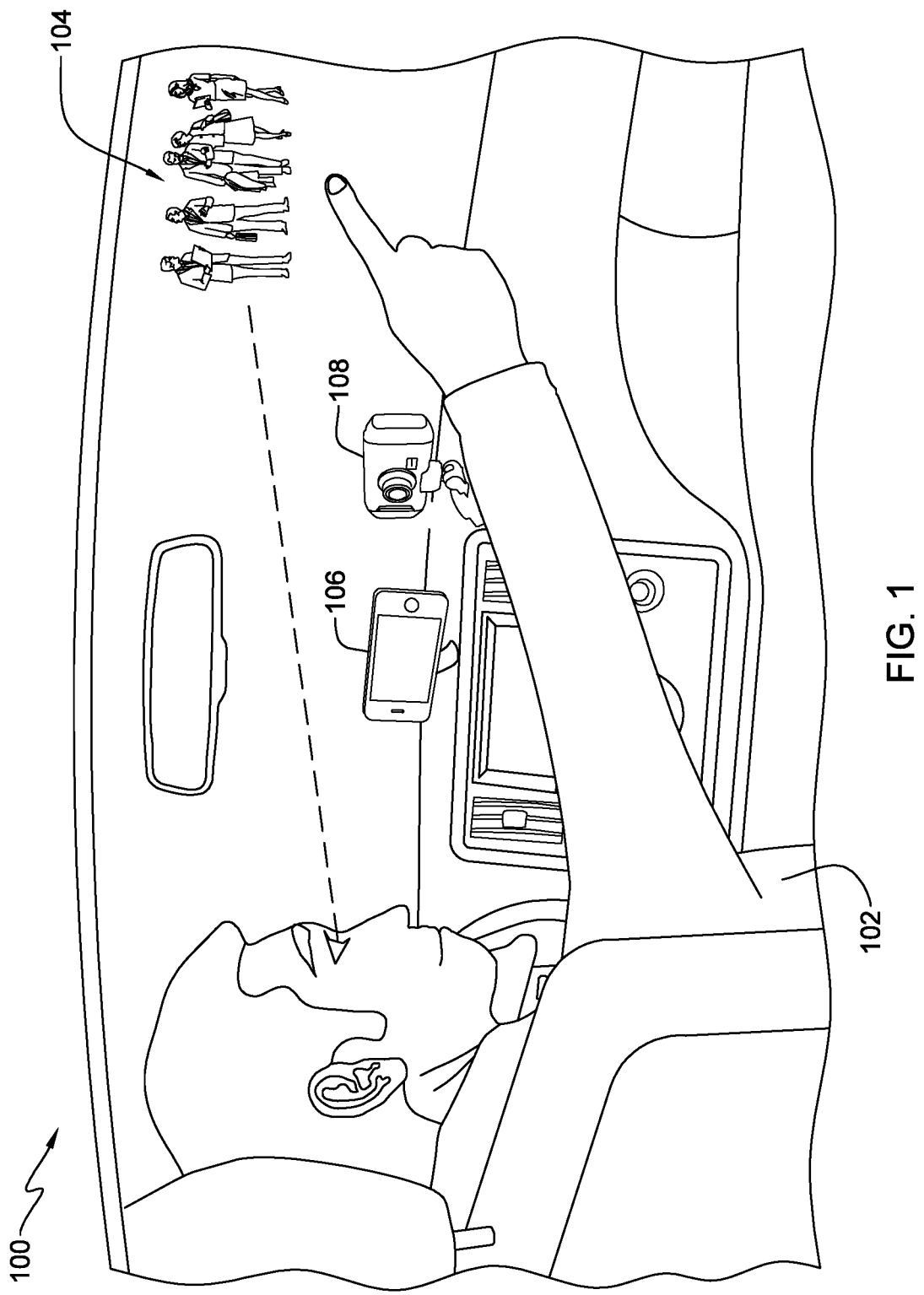
FIG. 1 depicts an example environment to incorporate and use aspects described herein.

FIG. 1 depicts an example environment to incorporate and use aspects described herein. In environment 100, user 102 drives a vehicle down a roadway and views a group of people 104 standing on a sidewalk. Accompanying the user in the user's vehicle is the user's smartphone 106 and a separate dash-mounted camera 108, which is oriented to capture images of the user, particularly at least the user's face. In this scenario, the user 102 desires information about this event, i.e. the group of people standing on the sidewalk. Accordingly, the user can submit to smartphone 106 a query, for instance a voice-based query to an IPA provided on the smartphone by speaking the query to the device. It is understood that the IPA may include software on the smartphone, software on a remote server, or a combination of the two. For instance, client IPA software installed on the smartphone may receive an input query and either handle the query directly, especially in cases where the information to satisfy the query is stored locally, or perform initial processing of the query before reaching out to server-side IPA software for handling the query.

In any case, IPA software on smartphone 106 listens for a query from user 102, such as a voice-based IPA query in which the user speaks a question or other prompt to the IPA that is captured as a query. The IPA can also collect contextual information surrounding the query, such as an indication about where the user was looking when providing the query, what the user was looking at, who the user was talking to, a direction in which the user was facing, and/or where the user was pointing, as examples.

In particular, a focus direction, referring to a direction of focus of the user, for example as indicated by the user's line of sight, can be ascertained. In this example, the system ascertains the user's line of sight to the group of people 104 by obtaining image(s) of the user's face and determining the line of sight by analyzing the images. Dash-mounted camera 108 acquires the image(s) of the user's face in this example. Camera 108 performs the line of sight analysis and/or provides the image(s) to the smartphone over a wireless communication path, such as Wi-Fi or Bluetooth, for the analysis. In other examples, one or more front-facing camera(s) of smartphone 106 acquires image(s) for analyzing to determine the user's focus direction and the dash-mounted camera 108 may or may not be present and may or may not contribute image(s) for the analysis. In addition to images of the user, camera(s), such as a rear-facing camera of smartphone 106, acquires image(s) of the environment in the direction of focus of the user. This captures image(s) of what the user is viewing when the query is made. Based on the user's focus direction and the images of the environment, software can identify a geographic area within the user's focus direction. The IPA software can perform a contextual search for user-generated content posted from or referencing that geographic area or a range around that area. The search can include different searches varied in scope (e.g. geographic area, and time) until adequate results are delivered or it is determined to end processing related to the query.

The user's spoken query can also be analyzed in identifying the location and subject of the query. In the example of FIG. 1, the user asks why the group of people 104 are standing on the sidewalk. The IPA can use this as guidance in identifying that the query involves something about a group of people on a sidewalk. The images of the environment acquired in the direction of focus of the user can be analyzed with the consideration that several individuals (a group of people) are expected to appear in the general vicinity where the user is focused. This can help to identify the particular geographic area that is the subject of the request. Thus, the IPA recognizes that the user is asking about the group of people 104 on the sidewalk at an ascertainable geographic location. The location is ascertainable using the smartphone's GPS device and an approximation of the distance to the group of people by analyzing image(s) of the group by the smartphone.

An initial scope of the search may be limited geographically and temporally. The geographic limitation may be to a particular radius, e.g. 30 feet, centered at the location of the group, and a temporal limitation may be directed to user-generated content generated within the past 30 minutes, as examples. User-generated content from social media platforms, such as Facebook® and Twitter®, and other sources may be searched for content known, assumed, or predicted to be associated with that geographic scope and generated within the timeframe (FACEBOOK is a registered trademark of Facebook, Inc., Menlo Park, Calif., U.S.A.; TWITTER is a registered trademark of Twitter, Inc., San Francisco, Calif., U.S.A.). If no recent past user-generated data is available to provide an adequate explanation, then software can search prior historical data to, for example, identify a historical pattern of user-generated data from the identified geographic area, and contextually analyze the historical data to find the answer to the query. If no information is available after the historical analysis, the IPA can notify the user indicating that no answer is found, that the query will remain active, and/or that a continued search is in progress.

Either based on an initial search failing to provide an answer, or concurrent to other searching, the system can send a notification to user(s) within or near that geographic area and request information for responding to the query. Based on another user returning information in response to the request, such as by positing user-generated content from or regarding that geographic area, the searching can identify this additional information, establish a response to the individual's query, and provide the response to the individual.

Additionally or alternatively, as noted, if no available data informs a sufficient response to the user's query, the query may be kept active and an updated search can be periodically or aperiodically performed. An updated search can provide information informing a sufficient response, in which case and answer can then be provided to the individual in response to the query.

FIG. 1 is just an example environment to incorporate and use aspects described herein. In some embodiments, the vehicle itself is equipped with cameras, a microphone, and an IPA client with which the user interacts, the IPA client built into a computer system of the vehicle, for example. In yet other embodiments, the user interacts with a wearable mobile device that provide camera(s), a microphone, and an IPA client. An example such wearable mobile device is a wearable head-mounted device, for instance a Google Glass device offered by Google Inc., of which GLASS is a trademark. Additionally, the subject of the query need not be a gathering of people but instead could be anything.

Accordingly, an initial search can extend though some recent timeframe, examining user-generated content posted within the past 1 minute for instance. If no adequate results are found, this timeframe may be extended to some longer timeframe, such as the past 5 minutes, 30 minutes, or 24 hours as examples. If no adequate results are found looking at historical data, the IPA can notify the user. The IPA can continue searching newly posted user-generated content, looking for posts that reference the time when and/or location where the query was submitted. If an individual posts something the day after the query explaining an event that happened at that time and location that is the subject of the query, the searching subsequent to the submission of the query can identify that and provide the response to the user.

The searching of the historical data can look for time/event based trends. An example trend may be that a group of people gathers at a bus stop around 5:00 PM each weekday. The IPA can discover this pattern and handle a query about why the group of people is congregating at that location around 5:00 on a weekday by responding that the group is waiting to the bus to arrive. The submission of the query may cause the IPA or some computer system working in conjunction with the IPA to perform the historical data analysis, which may otherwise never have been performed on the data. Alternatively, a prior historical analysis, performed in response to another query or for any other reason, may already suggest the answer to the user's submitted query, in which case the response may already be available based on that priori analysis.

Additional information such as the particular bus route, destination, etc. may also be searched and provided as part of response. Discovery of this trend can be based on user-generated content posted from that location, such as a post by an individual indicating that the individual is currently waiting at that location for the bus.

The IPA software, e.g. installed on the user's mobile device, can identify the individual's focus direction at the time the query is presented and accordingly identify a geographic area range on which the question is to be searched. A user will typically look at such an area when submitting the query to the IPA. Software will identify the area at that point of time and then contextually analyze the query. The focus direction can be useful because merely a location of the individual as obtained by the GPS device of the smartphone may not sufficiently indicate the location of the event that is the subject of the query, since there may be many events occurring surrounding the individual. The line-of-sight analysis helps to identify exactly what the user intends to be searched in handling the query.

Figure 2A:
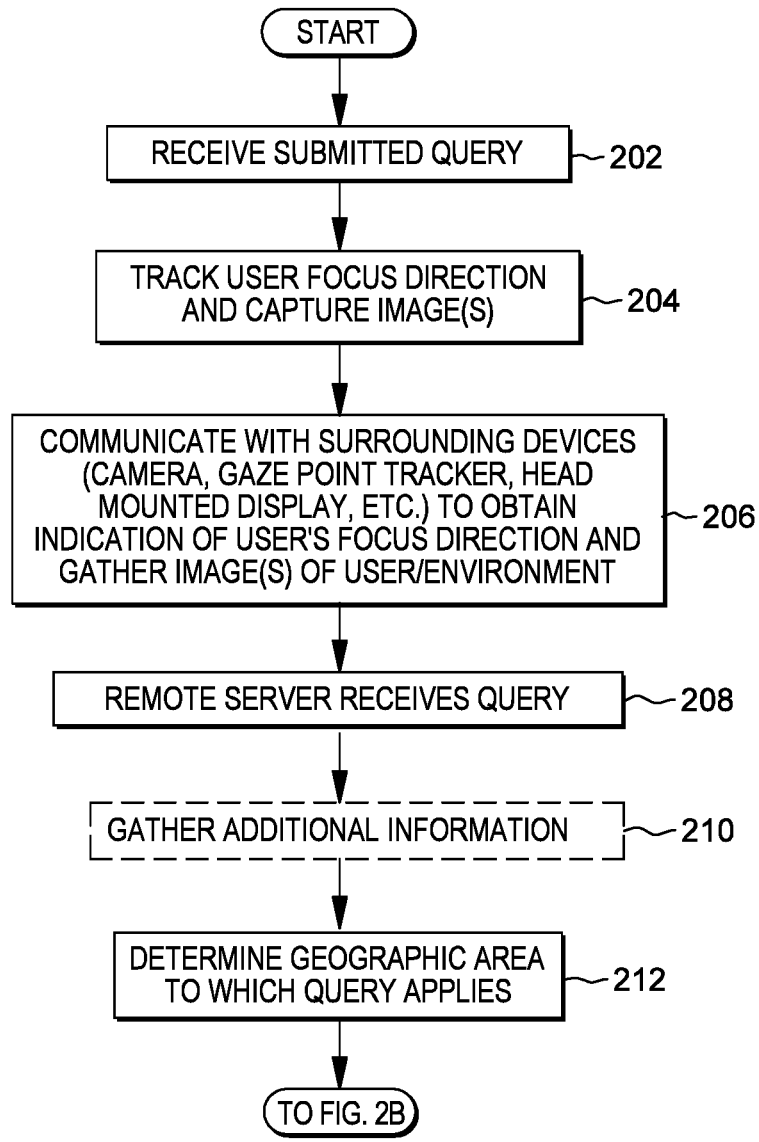
FIGS. 2A-2B depict an example process for focus-assisted query response determination, in accordance with aspects described herein.
Figure 2B:
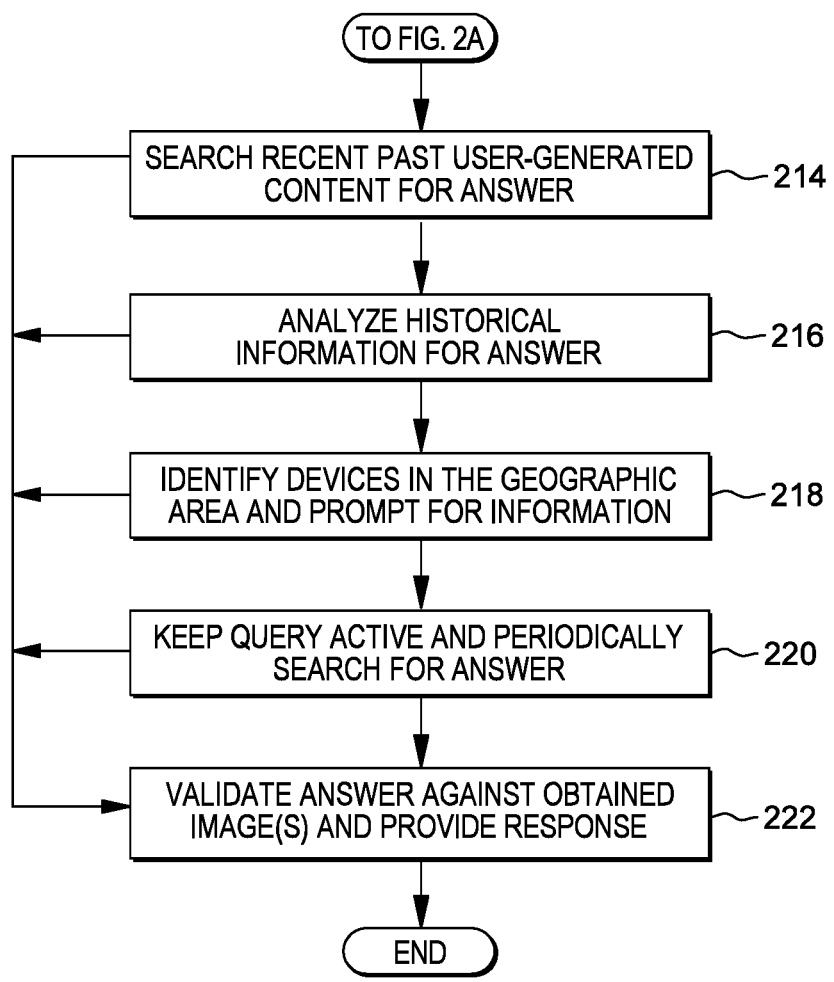

FIGS. 2A-2B depict an example process for focus-assisted query response determination, in accordance with aspects described herein. In the example of FIG. 2, an individual possesses a device, such as a mobile device, having or using IPA software installed on the device, a remote device, or a combination of the two. The IPA software is one example of software that can perform the process of FIGS. 2A-2B. Devices to track the individual's gaze point are also present, an example of which includes one or more cameras that obtain image(s) of the individual's face for analysis to determine the individual's focus direction. The same camera(s) or other camera(s) are also present and can obtain image(s) of the environment around the individual. The cameras to obtain images may be part of the individual's mobile device. In one particular example, the individual's mobile device includes a front-facing camera that obtains image(s) of the individual and a rear camera to obtain image(s) of the environment. In any case, IPA software of the mobile device is able to communicate with these cameras and other devices to receive additional contextual information when the individual presents a query.

Referring to FIG. 2A, the process begins with the IPA software receiving a submitted query (202), such as a question. A camera or gaze point tracker tracks the user focus direction and the camera captures image(s) of the user (204). The IPA communicates with these other devices (head-mounted device, gaze point tracker, camera(s) installed in the environment, etc.) to obtain an indication of the user's focus direction when the question was asked, and also gather image(s) of the environment (206). The images of the environment may be obtained based on determining a direction to which the user's focus is directed. Alternatively, camera(s) may continually or on-demand capture images of the surrounding environment without regard to the user's focus direction, and the images depicting the environment in the direction of the user's focus may be identified and provided to the IPA based on identifying the user's focus direction.

The remote server receives the query (208) and gathers/solicits additional information (210) if desired. If the question is not clear and also not complete, the remote server may prompt for additional information from the IPA client on the mobile device. For example, the remote server may reach back out to the mobile device for information known to the mobile device but not necessarily to the remote server, such as details about a calendar appointment or contact of the individual submitting the query.

Based on the focus direction, and captured image/video, the remote server can calculate a possible geographic area range where user was looking when asking the question. Thus, the process also determines a geographic area to which the query applies (212). This area may be a target area from which an appropriate answer may be searched. Software can extrapolate the focus direction and, based on the extrapolated focus direction, determine an approximate geographic area range. This can involve correlating a specific location of content in the images, the content being what the user is focused on in submitting the query, to a geographic location. This may be aided by examining content of the submitted query, such as audio content. Using the above example in which a group is waiting at a bus stop, the correlation may identify a "group of people", as spoken by the user as part of the submitted query, in the image(s) and verify that the user's focus was directed to the identified group. Based on GPS data from the user's device and/or image recognition, approximate GPS coordinates of the group of people can be determined. That GPS location represents the geographic area to which the query applies.

The process then begins a search for an appropriate response to the query. Referring to FIG. 2B, initially the remote server can search for recent past user-generated content for an answer (214). The initial scope may be the identified geographic area or may be a larger area covering a surrounding area range. One target of the search may be social media postings that tag or indicate the geographic area. Using the above example of FIG. 1, an individual in the group of people may have posted a social media status indicating, "Movie ended, waiting for bus". The remote server may be aware of the post from that location based on the individual tagging the post with that location, or the remote server otherwise being aware of the user's location. In this regard, the individual's mobile device may be configured for location sharing to share the user's location with a facility providing location-based services. In any case, the remote server can use that post to identify that the group of people is waiting for a bus.

If no answer is found from searching recent past user-generated content, the process continues with the IPA analyzing historical information from the geographic area for an answer (216). This can include analyzing historical user-generated content and/or mobile device location logs, as examples. Mobile device tracking information can indicate gathering points and times, revealing trends and helping to identify patterns. Such trends and patterns can provide useful leads for predicting an occurrence, such as the ending of an event or occurrence of a traffic jam, as examples. These occurrences may serve as the answers or explanation of events that are the subject of user-submitted queries.

If still no answer is provided from the historical data, the process can identify mobile devices in that geographic area and deliver a notification that prompts the device users for information (218). A prompt may be a prompt to post an updated social network status, as an example, or may be a more direct prompt tailored based on the submitted query, such as "as you waiting for the bus?" or "what are you waiting for in this location?". The information provided by a user in the geographic area could be text, voice, or media (images, video) content in response. The information may inform an answer to the query. In addition, these responses can be saved as historical information that may be analyzed (216) in connection with a future query.

If still no answer is determined, the remote server can keep the question active and inform the submitting individual about the delay. This may be necessary to provide time for users to generate content about the occurrence and post it. IPA software on the remote server can periodically search for an answer to the query by analyzing various user-generated content generated subsequent to the submission of the query (220). A newspaper article published the day after an event may inform an answer to an individual's query submitted during the event, for instance. Published articles, social media posts, and news alerts are all examples of user-generated content that may inform an answer to a query. Again, this periodic searching may be bounded based on a defined geographic area range and/or timeframe.

At any point, the searching (214, 216, 218 and/or 220) may be re-performed with an expanded scope. The geographic area and/or searched timeframe may be expanded and another search performed. The initial geographic area may be 10 meters, for example, and upon failure to discover an answer to one or more of searching 214, 216, 218 and/or 220, the geographic area being searched may be expanded, for instance to 100 meters, and searching 214, 216, 218 and/or 220 repeated. The timeframe being searched may also be expanded. The initial timeframe may be the five minutes before and after the query was submitted, but then expanded to 30 minutes before and 20 minutes after query submission, for instance.

When a candidate answer is identified by the IPA, the identified answer can be validated against image(s) of the scene, captured when the query was submitted, and a response provided if the answer is validated (222). The emphasis of the validation can be on providing a level of confidence that the candidate answer is correct, or on providing a level of confidence that the candidate answer is not incorrect (i.e. that the proposed answer is unlikely to be correct). Either way, the validation can provide a level of confidence in the identified answer. This validation can check whether the identified answer is contextually related to what is depicted in the image(s) of the scene being viewed by the individual when submitting the query. As an example, suppose that the candidate answer was derived by identifying that a group of people accumulates at the bus stop at that time of day each day, but the images depict the group of people all staring at an accident in the roadway. Suppose also that there were some social media posts and traffic alerts about an accident on that roadway. The candidate answer (waiting for the bus) may be discarded in light of this other information and the validation against the image(s) obtained of the environment, which depicts the group all focusing their attention in the same direction (something that would rarely be the case if people are only waiting for a bus). The appropriate answer to the query may thus be determined to instead be that the group is watching the scene of an accident, and this may be provided back to the individual as the appropriate response to the query.

Advantageously, context for a submitted IPA query is provided by ascertaining the individual's focus direction at the time the query is submitted and contextually relating captured image(s) to candidate answer(s) to confirm the correctness/appropriateness of an answer. Additional aspects can include notifying other users to volunteer an answer to a query, where those users are identified based on their relation to a geographic and temporal scope of the query, for instance they were located in that geographic area at the time of the query.

Figure 3A:
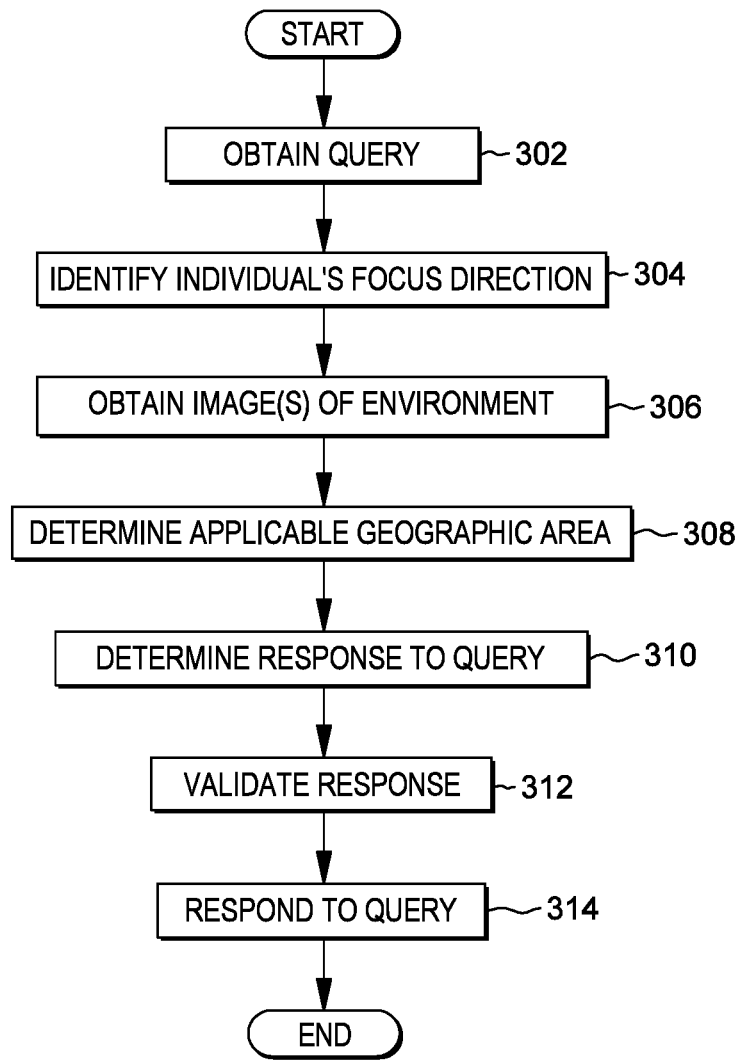
FIG. 3A depicts another example process for focus-assisted query response determination, in accordance with aspects described herein.

FIG. 3A depicts another example process for focus-assisted query response determination, in accordance with aspects described herein. The process of FIG. 3A may be performed by one or more computer system(s), such as a mobile device of an individual, a remote computer system in communication with such a mobile device, or a combination of the two, as examples. Specifically, aspects of the processing may be performed by IPA software executing on the one or more computer system(s).

The process begins by obtaining a query submitted by an individual to an intelligent personal assistant (302). In some examples, the query submitted by the individual includes a voice-based query obtained by a mobile device of the individual. The process continues by identifying a direction of focus of the individual at a time the individual submits the query to the intelligent personal assistant (304). The direction of focus may refer to the individual's line of eye sight. Identifying the direction of focus of the individual can include obtaining at least one image of the individual at the time the individual submits the query to the intelligent personal assistant, performing an analysis of the at least one image of the individual, and ascertaining the focus direction of the individual based on an analysis of the at least one image of the individual.

The process also obtains one or more images of an environment in the direction of focus of the individual (306). The image(s) may be obtained in response to and based on identifying the individual's focus direction, or may be obtained as part of a generalized capturing of images of the environment. In any case, based at least in part on the direction of focus, the process determines a geographic area to which the query applies (308). The process determines a response to the query (310), which determining the response includes searching user-generated content associated with the geographic area. In some examples, the user-generated content includes social media posts and the user-generated content being associated with the geographic area includes the user-generated content being posted from the geographic area or indicating/mentioning the geographic area.

The determined response is validated (312), for instance against the captured image(s) of the environment. This validation can include determining a level of consistency with the what is depicted in the captured image(s) of the environment. In one example the validation is to determine with a level of confidence whether the response is consistent with and indicated by the images. In another example, the validation is to determine whether the response is inconsistent with what is depicted in the captured image(s) of the environment.

When a validated response has been determined, the process responds to the query with the determined response (314) and the process ends.

As noted, the query submitted by the individual can include a voice-based query obtained by a mobile device of the individual. Additionally, the mobile device of the individual can perform the identifying the direction of focus of the individual, for instance by using a front-facing camera to capture image(s) reflecting the line of sight of the user. The mobile device additionally or alternatively performs the obtaining the image(s) of the environment using at least one camera of the mobile device, such as a rear-facing camera of the mobile device.

Figure 3B:
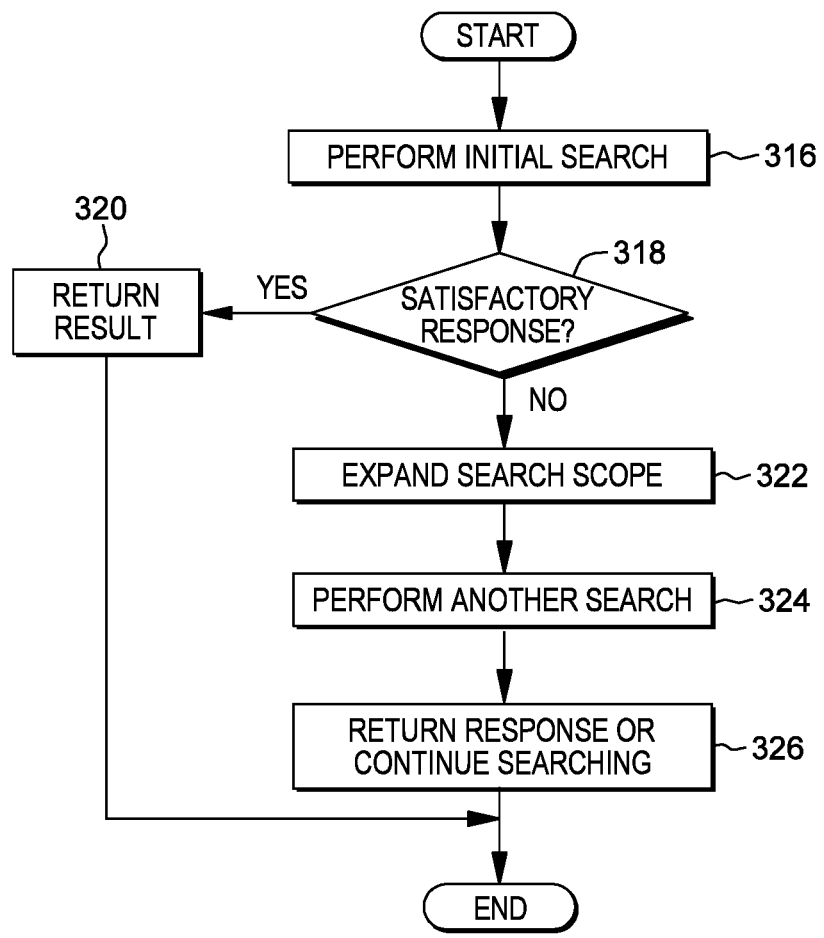
FIGS. 3B-3D depict example processes for query response determination, in accordance with aspects described herein.
Figure 3C:
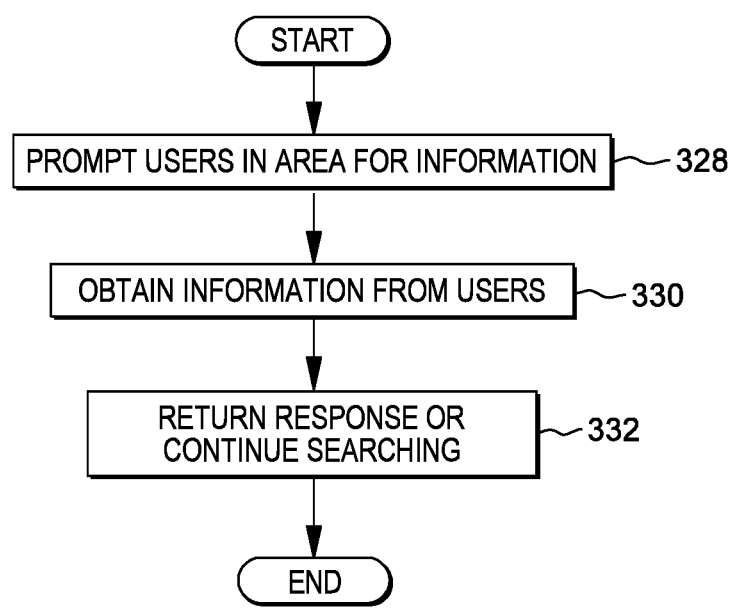
Figure 3D:
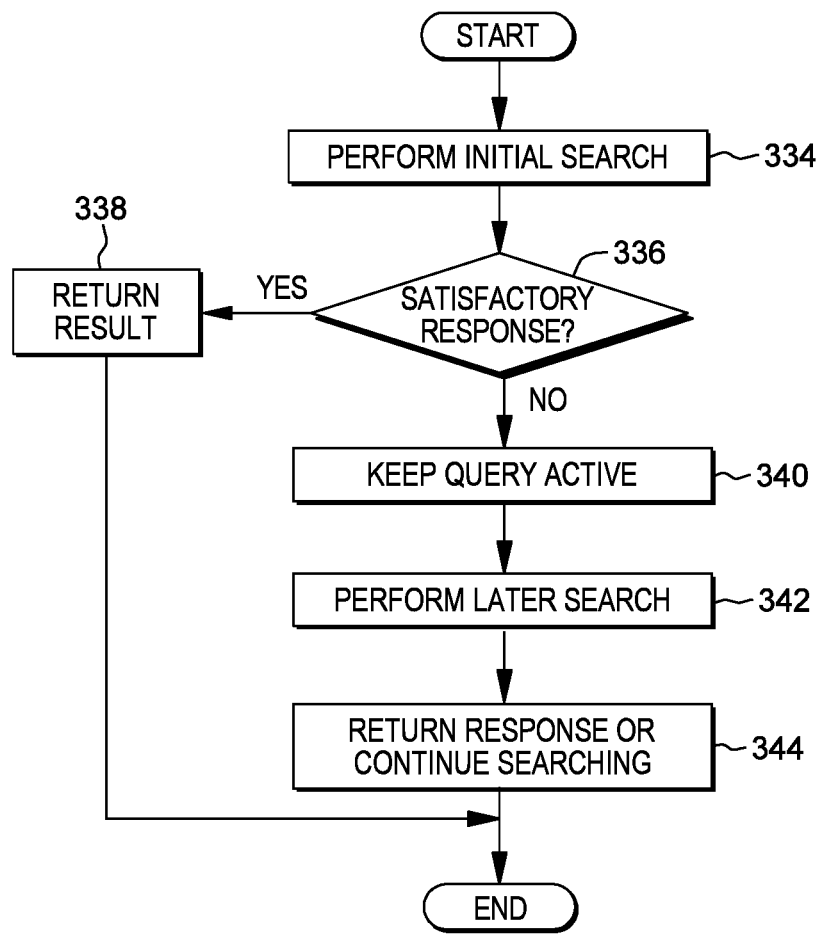

An aspect of FIG. 3A includes determining a response to the query (310). FIGS. 3B-3D depict example processes for query response determination, in accordance with aspects described herein. In some examples, determining the response to the query includes a combination of the processes of FIGS. 3B-3D.

Referring to FIG. 3B, the process performs an initial search (316) for user-generated content generated within an initial past timeframe and within an initial geographic region of which the determined geographic area is a part. The process determines whether a satisfactory response was found (318), and if so the process of FIG. 3B returns the result (320) and ends. In one example, upon FIG. 3B ending, overall query processing proceeds to response validation described with reference to FIG. 3A, #312, however in some examples, the response validation is wrapped into inquiry 318 of FIG. 3B.

Based on the initial search failing to determine a satisfactory response to the query (318), the process of FIG. 3B continues by performing another search for user-generated content by expanding the search scope (322) and performing the another search (324). The another search searches for user-generated content generated within an expanded past timeframe greater than the initial past timeframe and/or within an expanded geographic region larger than the initial geographic region, as examples. The determined response to the query may be determined based on user-generated content identified by the another search, in which case the response is returned (for instance returned to the process of FIG. 3A for response validation, 312) or searching continues (326). Continuance of the searching could return to expand the search scope (322) and perform another search (324). Additionally or alternatively, continuing the searching could proceed to another process for query response determination, for example the process of FIG. 3C and/or process of FIG. 3D.

In a particular example, the another search (324) searches historical information and identifies a trend in the user-generated content generated within the expanded timeframe or the expanded geographic region. The trend could inform a predictable occurrence at a time of the query and at the geographic area to which the query applies. In this situation, the determined response can include an indication of the predictable occurrence. An example predictable occurrence is the ending of an event, such as a movie, or a grouping of people in a particular location at a particular time for a particular purpose, like at a bus stop waiting for a bus.

The process of FIG. 3C is also an example process for query response determination. In some examples, this process is performed based on initial searching and possibly additional searching using expanded search scope (e.g. FIG. 3B) failing to provide a satisfactory response to the query. The process prompts one or more users in the geographic area for information informing the response to the query (328). The process, in response, obtains the information from the one or more users (330). An example prompt prompts a user to post to social media and the obtained information could be the user's post in response to the prompt. Then, the process returns the determined response to the query (based on the obtained information from the one or more users, in which case the response is returned, for instance returned to the process of FIG. 3A for response validation, 312) or continues searching (332), for instance if a response is not determined from the obtained information, or no information is obtained within a timeframe after the prompt is provided to the users in the area. Continuance of the searching (332) could return to re-prompt (328) the users and/or additional users, such as users within an expanded geographic area after expanding the search. Additionally or alternatively, continuing the search could proceed to another process for query response determination, for example the process of FIG. 3B and/or process of FIG. 3D.

The process of FIG. 3D is another example process for query response determination. The process performs initial searching (such as searching of FIG. 3B, 3C) and returns a result (338) if a satisfactory response was found (336, Y). The initial search can include past user-generated content, generated prior to the submission of the query by the individual. Based on the initial search failing to determine a satisfactory response to the query (336, N), the process of FIG. 3D continues by keeping the query active and providing an indication to the individual that the query remains active (340), and performing a later search of user-generated content generated during a timeframe after the initial search (342). The determined response to the query may be determined based on user-generated content generated during the timeframe after the initial search and identified by the later search, in which case the response is returned (for instance returned to the process of FIG. 3A for response validation, 312) or searching continues (344). Continuance of the search could return to iteratively performing a later search (342), for instance every hour until an adequate response is determined. Additionally or alternatively, continuing the searching could proceed to another process for query response determination, for example the process of FIG. 3B and/or process of FIG. 3C.

Described herein are facilities providing focus-assisted intelligent personal assistant (IPA) query response determination, where IPA software identifies user-generated content from one or more users and, based on a contextual analysis of a query, including ascertained focus direction of a querying individual and image(s) against which a candidate response to the query is validated, provides an appropriate response to the individual. Processes described herein may be performed singly or collectively by one or more computer systems, such as computer system(s) described below with reference to FIG. 4. In some embodiments, such a computer system may be, include, or be incorporated into a mobile device or vehicle, as examples.

Figure 4:
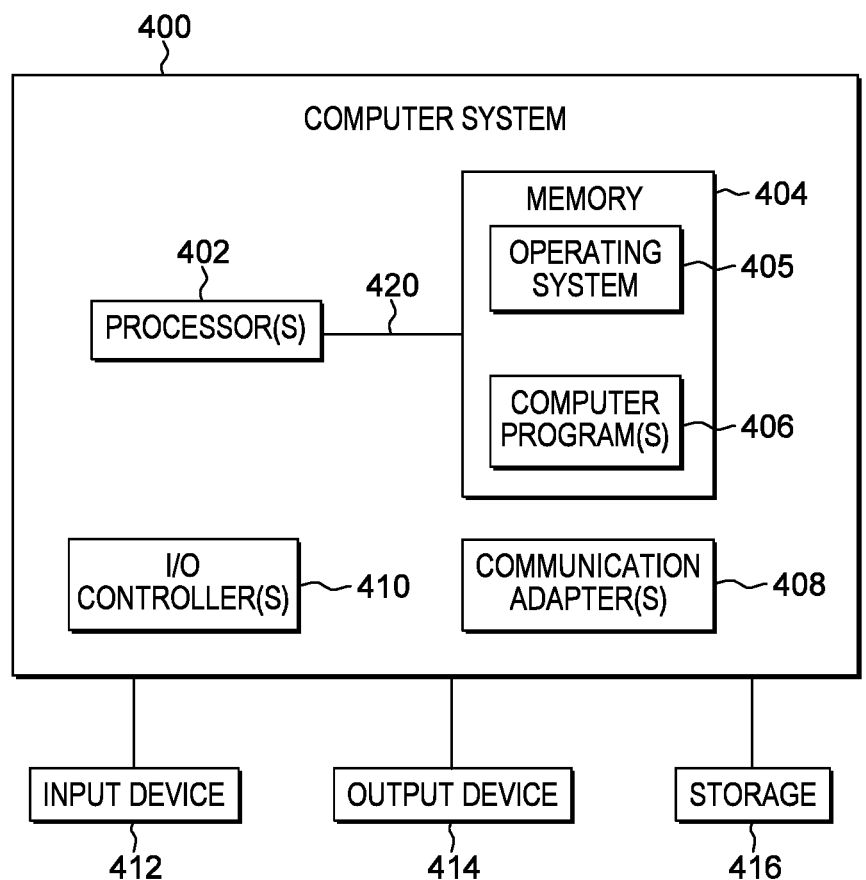
FIG. 4 depicts an example of a computer system to incorporate or use aspects described herein.

FIG. 4 depicts one example of a computer system to incorporate or use aspects described herein. A computer system may also be referred to herein as a data processing device/system or computing device/system, or simply a computer. Computer system 400 may be based on one or more of various system architectures such as those offered by International Business Machines Corporation (Armonk, N.Y., USA), Intel Corporation (Santa Clara, Calif., USA), or ARM Holdings plc (Cambridge, England, United Kingdom), as examples.

Computer system 400 is suitable for storing and/or executing program code and includes at least one processor 402 coupled directly or indirectly to memory 404 through, e.g., a system bus 420. In operation, processor(s) 402 obtain from memory 404 one or more instructions for execution by the processors. Memory 404 may include local memory employed during actual execution of the program code, bulk storage, and cache memories which provide temporary storage of at least some program code in order to reduce the number of times code must be retrieved from bulk storage during program code execution. A non-limiting list of examples of memory 404 includes a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. Memory 404 includes an operating system 405 and one or more computer programs 406, for instance an intelligent personal assistant to perform aspects described herein, such as those described with reference to FIGS. 2A-2B and 3A-3D, as examples.

Input/Output (I/O) devices 412, 414 (including but not limited to displays, microphones, speakers, accelerometers, gyroscopes, magnetometers, light sensors, proximity sensors, GPS devices, cameras, etc.) may be coupled to the system either directly or through I/O controllers 410.

Network adapter(s) 408 may also be coupled to the system to enable the computer system to become coupled to other computer systems, storage devices, or the like through intervening private or public networks. Ethernet-based (such as Wi-Fi) interfaces and Bluetooth® adapters are just examples of the currently available types of network adapters 408 used in computer systems.

Computer system 400 may be coupled to storage 416 (e.g., a non-volatile storage area, such as magnetic disk drives, optical disk drives, a tape drive, etc.), having one or more databases. Storage 416 may include an internal storage device or an attached or network accessible storage. Computer programs in storage 416 may be loaded into memory 404 and executed by a processor 402 in a manner known in the art.

The computer system 400 may include fewer components than illustrated, additional components not illustrated herein, or some combination of the components illustrated and additional components. Computer system 400 may be or include any computing device known in the art, such as a mainframe, server, personal computer, workstation, laptop, handheld or mobile computer, tablet, wearable device, telephony device, network appliance (such as an edge appliance), virtualization device, storage controller, etc.

Figure 5:
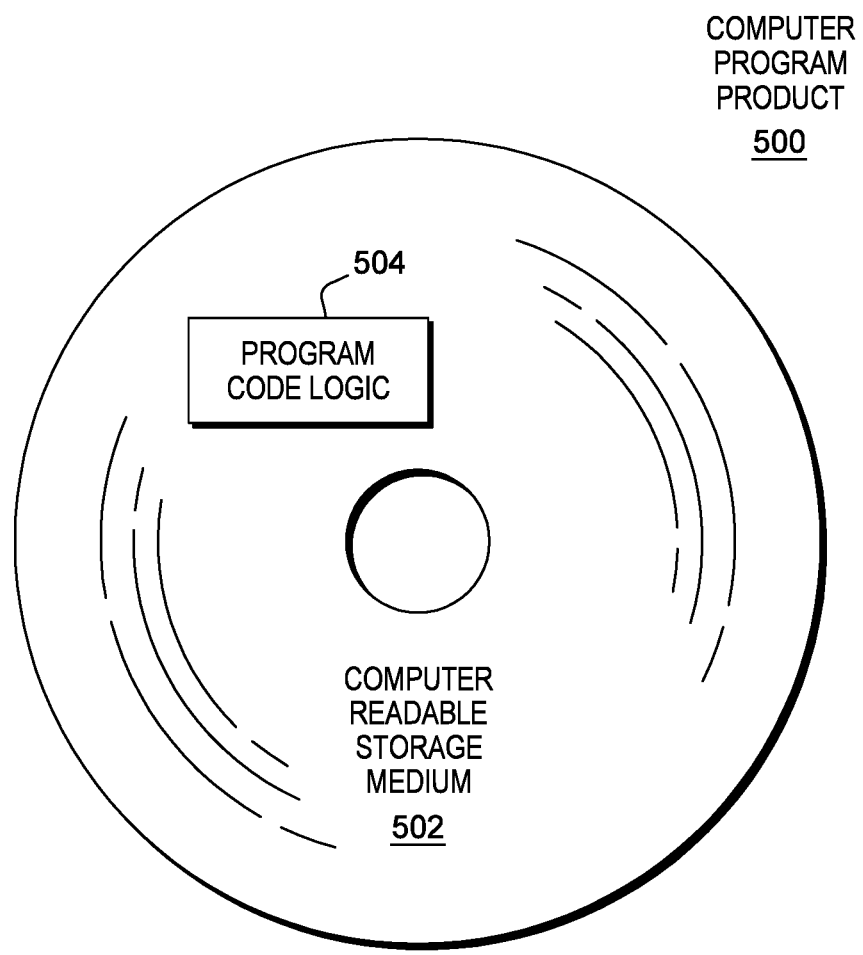
FIG. 5 depicts one embodiment of a computer program product.

Referring to FIG. 5, in one example, a computer program product 500 includes, for instance, one or more computer readable storage media 502 to store computer readable program code means, logic and/or instructions 504 thereon to provide and facilitate one or more embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method comprising:

obtaining a query submitted by an individual to an intelligent personal assistant;

identifying a direction of focus of the individual at a time the individual submits the query to the intelligent personal assistant, the direction of focus being a direction of the individual's visual line-of-sight;

obtaining one or more images of an environment in the direction of focus of the individual;

determining, based at least in part on the direction of focus, a geographic area to which the query applies;

identifying a candidate response to the query, the identifying the candidate response comprising searching user-generated content associated with the geographic area, the searching comprising performing a data analysis of historical data and identifying a trend in the user-generated content that reflects a pattern of past occurrences that occurred prior to submission of the query by the individual, the pattern of past occurrences informing a predictable occurrence that is happening at a time of the query and at the geographic area to which the query applies, and wherein the candidate response is proposed for responding to the query, is subject to validation, and comprises an indication of the predictable occurrence;

validating the candidate response to be provided in response to the query against the captured one or more images of the environment to check whether the candidate response is contextually related to a context determined from what was captured in the one or more images, the checking facilitating determining whether the candidate response is a most appropriate response to the query, wherein the validating comprises determining a level of consistency between the candidate response and the captured one or more images of the environment, in which the validating determines whether the candidate response is inconsistent with a context of what is depicted in the captured one or more images of the environment, and the validating confirms consistency between the candidate response and the context of what is depicted in the captured one or more images of the environment;

based on the validating confirming consistency between the candidate response and the context of what is depicted in the captured one or more images of the environment, responding to the query with the candidate response;

obtaining another query submitted by the individual, and, based on obtaining the another query, repeating, relative the another query, the identifying the direction of focus, the obtaining one or more images to obtain one or more additional images of the environment, the determining the geographic area to determine a geographic area to which the another query applies, the identifying the candidate response to identify a candidate response to the another query, and the validating the candidate response to the another query, wherein the repeating the validating the candidate response to the another query fails to confirm consistency between the candidate response to the another query and a context depicted in the obtained one or more additional images of the environment;

keeping the another query active and providing an indication to the individual that the another query remains active; and performing a later search of user-generated content generated during a timeframe after a previous search of the user-generated content.

2. The method of claim 1, wherein the searching the user-generated content associated with the geographic area comprises:

performing an initial search for user-generated content generated within an initial past timeframe and within an initial geographic region of which the determined geographic area is a part; and based on the initial search failing to determine a satisfactory response to the query, performing another search for user-generated content generated within an expanded past timeframe greater than the initial past timeframe or within an expanded geographic region larger than the initial geographic region, wherein the candidate response to the query is determined based on user-generated content identified by the another search.

3. The method of claim 2, wherein the performing the data analysis and the identifying the trend is part of the another search, in which the trend in the user-generated content is identified within the expanded timeframe or the expanded geographic region.

4. The method of claim 1, wherein the identifying the candidate response to the query further comprises:

prompting, via a notification, one or more users in the geographic area at the time of the query to volunteer information informing a response to the query, the one or more users being different from the individual submitting the query;

obtaining the information from the one or more users; and determining the candidate response based at least in part on the obtained information from the one or more users.

5. The method of claim 1, wherein the user-generated content comprises social media posts and wherein the user-generated content being associated with the geographic area comprises the user-generated content being posted from the geographic area or indicating the geographic area.

6. The method of claim 1, wherein the identifying the direction of focus of the individual at the time the individual submits the query comprises:

obtaining at least one image of the individual at the time the individual submits the query to the intelligent personal assistant;

performing an analysis of the at least one image of the individual; and ascertaining the focus direction of the individual based on an analysis of the at least one image of the individual.

7. The method of claim 1, wherein the query submitted by the individual comprises a voice-based query obtained by a mobile device of the individual, wherein the mobile device of the individual performs the identifying the direction of focus of the individual at the time the individual submits the query, and wherein the mobile device of the individual performs the obtaining the one or more images of the environment using at least one camera of the mobile device.

8. The method of claim 1, wherein the performing the later search of the user-generated content generated during the timeframe after the previous search of the user-generated content is iteratively repeated until the consistency between the candidate response to the another query and the context depicted in the obtained one or more additional images is confirmed.

9. A computer program product comprising:

a computer readable storage medium readable by a processing circuit and storing instructions for execution by the processing circuit for performing a method comprising:

obtaining a query submitted by an individual to an intelligent personal assistant, the direction of focus being a direction of the individual's visual line-of-sight;

identifying a direction of focus of the individual at a time the individual submits the query to the intelligent personal assistant;

obtaining one or more images of an environment in the direction of focus of the individual;

determining, based at least in part on the direction of focus, a geographic area to which the query applies;

identifying a candidate response to the query, the identifying the candidate response comprising searching user-generated content associated with the geographic area, the searching comprising performing a data analysis of historical data and identifying a trend in the user-generated content that reflects a pattern of past occurrences that occurred prior to submission of the query by the individual, the pattern of past occurrences informing a predictable occurrence that is happening at a time of the query and at the geographic area to which the query applies, and wherein the candidate response is proposed for responding to the query, is subject to validation, and comprises an indication of the predictable occurrence;

validating the candidate response to be provided in response to the query against the captured one or more images of the environment to check whether the candidate response is contextually related to a context determined from what was captured in the one or more images the checking facilitating determining whether the candidate response is a most appropriate response to the query, wherein the validating comprises determining a level of consistency between the candidate response and the captured one or more images of the environment, in which the validating determines whether the candidate response is inconsistent with a context of what is depicted in the captured one or more images of the environment, and the validating confirms consistency between the candidate response and the context of what is depicted in the captured one or more images of the environment; and based on the validating confirming consistency between the candidate response and the context of what is depicted in the captured one or more images of the environment, responding to the query with the candidate response;

obtaining another query submitted by the individual, and, based on obtaining the another query, repeating, relative the another query, the identifying the direction of focus, the obtaining one or more images to obtain one or more additional images of the environment, the determining the geographic area to determine a geographic area to which the another query applies, the identifying the candidate response to identify a candidate response to the another query, and the validating the candidate response to the another query, wherein the repeating the validating the candidate response to the another query fails to confirm consistency between the candidate response to the another query and a context depicted in the obtained one or more additional images of the environment;

keeping the another query active and providing an indication to the individual that the another query remains active; and performing a later search of user-generated content generated during a timeframe after a previous search of the user-generated content.

10. The computer program product of claim 9, wherein the searching the user-generated content associated with the geographic area further comprises:

performing an initial search for user-generated content generated within an initial past timeframe and within an initial geographic region of which the determined geographic area is a part; and based on the initial search failing to determine a satisfactory response to the query, performing another search for user-generated content generated within an expanded past timeframe greater than the initial past timeframe or within an expanded geographic region larger than the initial geographic region, wherein the candidate response to the query is determined based on user-generated content identified by the another search, wherein the performing the data analysis and the identifying the trend is part of the another search, in which the trend in the user-generated content is identified within the expanded timeframe or the expanded geographic region.

11. The computer program product of claim 9, wherein the user-generated content comprises social media posts and wherein the user-generated content being associated with the geographic area comprises the user-generated content being posted from the geographic area or indicating the geographic area.

12. The computer program product of claim 9, wherein the identifying the direction of focus of the individual at the time the individual submits the query comprises:

obtaining at least one image of the individual at the time the individual submits the query to the intelligent personal assistant;

performing an analysis of the at least one image of the individual; and ascertaining the focus direction of the individual based on an analysis of the at least one image of the individual.

13. The computer program product of claim 9, wherein the query submitted by the individual comprises a voice-based query obtained by a mobile device of the individual, wherein the mobile device of the individual performs the identifying the direction of focus of the individual at the time the individual submits the query, and wherein the mobile device of the individual performs the obtaining the one or more images of the environment using at least one camera of the mobile device.

14. A computer system comprising:
a memory; and
a processor in communication with the memory, wherein the computer system is configured to perform a method, the method comprising:

obtaining a query submitted by an individual to an intelligent personal assistant;

identifying a direction of focus of the individual at a time the individual submits the query to the intelligent personal assistant, the direction of focus being a direction of the individual's visual line-of-sight;

obtaining one or more images of an environment in the direction of focus of the individual;

determining, based at least in part on the direction of focus, a geographic area to which the query applies;

identifying a candidate response to the query, the identifying the candidate response comprising searching user-generated content associated with the geographic area, the searching comprising performing a data analysis of historical data and identifying a trend in the user-generated content that reflects a pattern of past occurrences that occurred prior to submission of the query by the individual, the pattern of past occurrences informing a predictable occurrence that is happening at a time of the query and at the geographic area to which the query applies, and wherein the candidate response is proposed for responding to the query, is subject to validation, and comprises an indication of the predictable occurrence;

validating the candidate response to be provided in response to the query against the captured one or more images of the environment to check whether the candidate response is contextually related to a context determined from what was captured in the one or more images the checking facilitating determining whether the candidate response is a most appropriate response to the query, wherein the validating comprises determining a level of consistency between the candidate response and the captured one or more images of the environment, in which the validating determines whether the candidate response is inconsistent with a context of what is depicted in the captured one or more images of the environment, and the validating confirms consistency between the candidate response and the context of what is depicted in the captured one or more images of the environment;

based on the validating confirming consistency between the candidate response and the context of what is depicted in the captured one or more images of the environment, responding to the query with the candidate response;

obtaining another query submitted by the individual, and, based on obtaining the another query, repeating, relative the another query, the identifying the direction of focus, the obtaining one or more images to obtain one or more additional images of the environment, the determining the geographic area to determine a geographic area to which the another query applies, the identifying the candidate response to identify a candidate response to the another query, and the validating the candidate response to the another query, wherein the repeating the validating the candidate response to the another query fails to confirm consistency between the candidate response to the another query and a context depicted in the obtained one or more additional images of the environment;

keeping the another query active and providing an indication to the individual that the another query remains active; and performing a later search of user-generated content generated during a timeframe after a previous search of the user-generated content.

15. The computer system of claim 14, wherein the searching the user-generated content associated with the geographic area further comprises:
- performing an initial search for user-generated content generated within an initial past timeframe and within an initial geographic region of which the determined geographic area is a part; and
- based on the initial search failing to determine a satisfactory response to the query, performing another search for user-generated content generated within an expanded past timeframe greater than the initial past timeframe or within an expanded geographic region larger than the initial geographic region, wherein the candidate response to the query is determined based on user-generated content identified by the another search, wherein the performing the data analysis and the identifying the trend is part of the another search, in which the trend in the user-generated content is identified within the expanded timeframe or the expanded geographic region.

16. The computer system of claim 14, wherein the identifying the direction of focus of the individual at the time the individual submits the query comprises:
- obtaining at least one image of the individual at the time the individual submits the query to the intelligent personal assistant;
- performing an analysis of the at least one image of the individual; and
- ascertaining the focus direction of the individual based on an analysis of the at least one image of the individual.

17. The computer system of claim 14, wherein the query submitted by the individual comprises a voice-based query obtained by a mobile device of the individual, wherein the mobile device of the individual performs the identifying the direction of focus of the individual at the time the individual submits the query, and wherein the mobile device of the individual performs the obtaining the one or more images of the environment using at least one camera of the mobile device.

* * * * *